(12) United States Patent
Fahldieck et al.

(10) Patent No.: US 10,259,665 B2
(45) Date of Patent: Apr. 16, 2019

(54) CONTAINER GRIPPER AND TRANSPORTING DEVICE FOR TRANSPORTING CONTAINERS

(71) Applicant: KHS GmbH, Dortmund (DE)

(72) Inventors: Andreas Fahldieck, Idar-Oberstein (DE); Nils Mallitzki, Simmern (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 15/563,068

(22) PCT Filed: Mar. 23, 2016

(86) PCT No.: PCT/EP2016/056347
§ 371 (c)(1),
(2) Date: Sep. 29, 2017

(87) PCT Pub. No.: WO2016/169717
PCT Pub. Date: Oct. 27, 2016

(65) Prior Publication Data
US 2018/0086571 A1    Mar. 29, 2018

(30) Foreign Application Priority Data

Apr. 21, 2015    (DE) .................. 10 2015 106 103

(51) Int. Cl.
*B65G 47/00*    (2006.01)
*B65G 47/86*    (2006.01)
(52) U.S. Cl.
CPC .... *B65G 47/847* (2013.01); *B65G 2201/0244* (2013.01)

(58) Field of Classification Search
CPC .. B65G 47/847; B65G 17/323; B25J 15/0028; B67C 7/0053; B67C 3/242
USPC .................. 198/470.1, 478.4, 481.1; 271/82
See application file for complete search history.

(56) References Cited

U.S. PATENT DOCUMENTS

| | | |
|---|---|---|
| 3,155,228 A | 11/1964 | Norwood |
| 4,055,943 A | 11/1977 | Reichert |
| 4,232,780 A | 11/1980 | Cross |
| 7,014,235 B1 * | 3/2006 | Ostwald ................. B25J 9/1612 294/119.1 |

(Continued)

FOREIGN PATENT DOCUMENTS

| | | |
|---|---|---|
| DE | 297 13 510 | 8/1998 |
| DE | 10 2005 014 838 | 10/2006 |

(Continued)

*Primary Examiner* — Joseph A Dillon, Jr.
(74) *Attorney, Agent, or Firm* — Occhiuti & Rohlicek LLP

(57) ABSTRACT

A container gripper has pivotable gripper arms and a blocking element that comprises a spring element with first and second regions that preloads the gripper arms into a closing position. The blocking element moves between a releasing position and a blocking position such that a closing force exerted in the blocking position exceeds that exerted in the releasing position. The spring elements interact with control surfaces of the gripper arms such that, when the blocking element is in the releasing position, the control surface takes effect against the first region, thereby causing the spring element to exert the first closing force and wherein, when the blocking element is in the blocking position, the control surface takes effect against the second region, thereby causing the spring element to exert the second closing force.

21 Claims, 7 Drawing Sheets

(56) References Cited

U.S. PATENT DOCUMENTS

| | | | | |
|---|---|---|---|---|
| 7,451,868 B2* | 11/2008 | Legallais | ............ | B65G 47/847 198/470.1 |
| 7,681,713 B2* | 3/2010 | Nishi | ............ | B65G 29/00 198/469.1 |
| 8,413,799 B2* | 4/2013 | Bodtlander | ............ | B65G 29/00 198/470.1 |
| 8,544,914 B2* | 10/2013 | Hessels | ............ | F16L 1/207 294/106 |
| 8,833,543 B2* | 9/2014 | Fahldieck | ............ | B08B 9/32 198/459.2 |
| 8,915,349 B2* | 12/2014 | Tas | ............ | B65G 29/02 198/377.03 |
| 8,925,710 B2* | 1/2015 | Borgatti | ............ | B65G 47/847 198/463.1 |
| 9,517,898 B2* | 12/2016 | Fahldieck | ............ | B65G 47/847 |
| 9,732,568 B2* | 8/2017 | Lindberg | ............ | E21B 19/14 |
| 2002/0167185 A1* | 11/2002 | Graffin | ............ | B65G 29/00 294/104 |
| 2003/0051976 A1* | 3/2003 | Preti | ............ | B65G 29/00 198/379 |
| 2005/0011730 A1* | 1/2005 | Wittmann | ............ | B65G 47/847 198/470.1 |
| 2008/0038099 A1* | 2/2008 | Burgmeier | ............ | B67C 3/242 414/222.01 |
| 2010/0007160 A1* | 1/2010 | Glotzl | ............ | B65G 47/847 294/203 |
| 2011/0148133 A1* | 6/2011 | Hessels | ............ | E21B 19/163 294/197 |
| 2011/0278134 A1* | 11/2011 | Voth | ............ | B29C 49/4215 198/478.1 |
| 2012/0285800 A1* | 11/2012 | Kraus | ............ | B65G 47/847 198/478.1 |
| 2012/0326460 A1* | 12/2012 | Knieling | ............ | B65G 47/847 294/203 |
| 2013/0193702 A1* | 8/2013 | Fahldieck | ............ | B67C 3/242 294/199 |
| 2014/0175819 A1* | 6/2014 | Wilson | ............ | B25J 15/0028 294/198 |
| 2014/0318079 A1 | 10/2014 | Gruson | | |
| 2015/0091316 A1* | 4/2015 | Fahldieck | ............ | B08B 9/426 294/99.1 |
| 2015/0113798 A1* | 4/2015 | Zhang | ............ | H02G 1/02 29/729 |
| 2015/0217947 A1* | 8/2015 | Singur | ............ | B65G 47/847 198/803.3 |
| 2015/0314966 A1* | 11/2015 | Fahldieck | ............ | B65G 47/847 294/199 |
| 2015/0321858 A1* | 11/2015 | Fahldieck | ............ | B65G 47/847 294/192 |
| 2015/0336699 A1* | 11/2015 | Fahldieck | ............ | B65G 47/847 198/867.05 |
| 2016/0121490 A1* | 5/2016 | Ottersland | ............ | E21B 19/14 294/198 |
| 2017/0327323 A1* | 11/2017 | Fahldieck | ............ | B65G 47/847 |
| 2017/0334664 A1* | 11/2017 | Mallitzki | ............ | B65G 47/847 |
| 2017/0349384 A1* | 12/2017 | Fahldieck | ............ | B65G 47/846 |

FOREIGN PATENT DOCUMENTS

| | | |
|---|---|---|
| DE | 20 2006 018379 | 1/2008 |
| DE | 10 2012 011 367 | 12/2013 |
| DE | 10 2012 111 754 | 6/2014 |
| DE | 10 2014 117 358 | 6/2016 |
| EP | 2 279 143 | 2/2011 |
| WO | WO2009/135597 | 11/2009 |

* cited by examiner

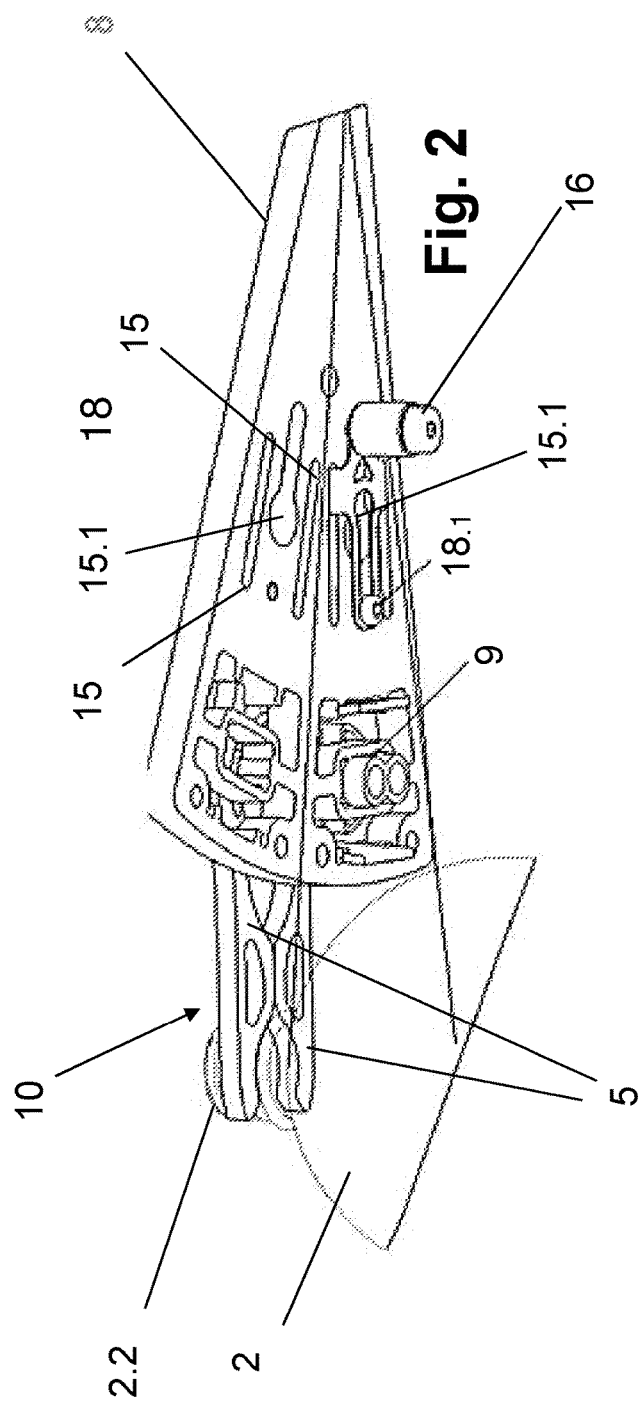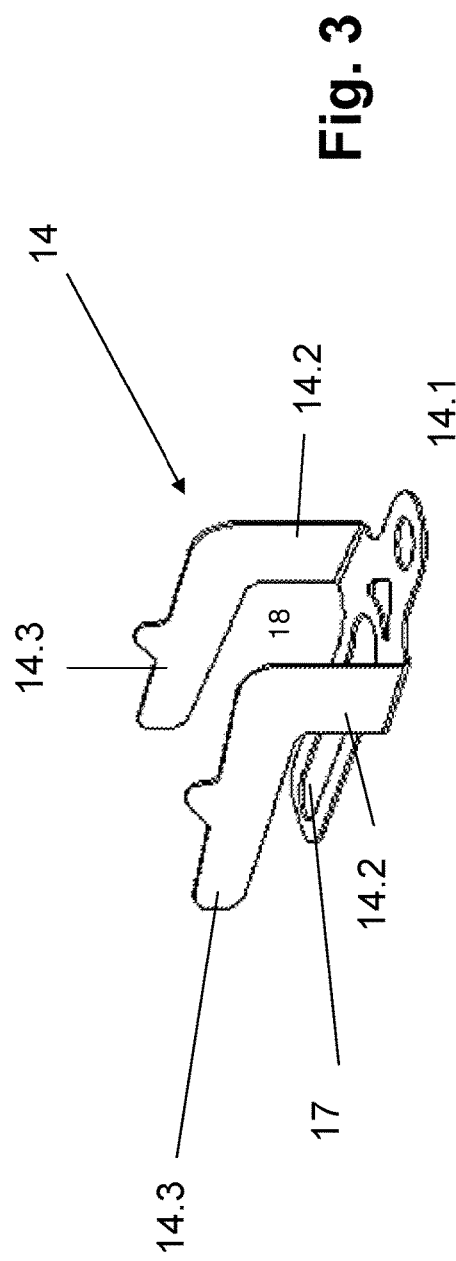

CONTAINER GRIPPER AND TRANSPORTING DEVICE FOR TRANSPORTING CONTAINERS

RELATED APPLICATIONS

This application is the national stage, under 35 USC 371, of PCT application PCT/EP2016/056347, filed on Mar. 23, 2016, which claims the benefit of the Apr. 21, 2015 priority date of German application DE 10 2015 106 103.1, the content of which is herein incorporated by reference.

FIELD OF INVENTION

The invention relates to a container gripper as well as to a transporting device for the transporting of containers, and in particular for the gripping, holding, and transporting of containers in the form of bottles, such as PET bottles.

BACKGROUND

In the course of processing containers, it is typical to place containers on a rotor and to transfer containers from one rotor to another. Because the rotor rotates, there is a tendency for containers to fly off the rotor due to centrifugal force.

To solve this problem, it is known to provide container grippers that hold the containers during processing. To promote error-free processing, it is important that a container gripper release when desired and that it not let go of the container during processing so that the container be transferred between rotors.

This causes conflicting demands for a gripper. On the one hand it must grip securely so that the container does not fly off. But on the other hand, it must grip weakly to promote exchange between grippers on different rotors.

SUMMARY

In some container grippers, two gripper arms are preloaded into a closed position by spring tongues or spring arms. These exert a closing force, for which purpose the spring arms are in turn supported against a blocking element. The blocking element can be moved relative to the spring arms in such a way that, in a position of the blocking element that corresponds to a releasing state with reduced closing force, the free ends of the spring arms are closer to each other than they would be in a second position of the blocking element. Increasing this distance increases the gripper's closing force. This corresponds to a blocking state of the container gripper.

In some container grippers, the closing force is achieved with gripper arms that are made in one piece with spring-elastic extensions. This restricts the materials that can be used to make the gripper arms.

In such grippers, the control element or blocking element is an eccentric element against which the extensions are supported. For controlling the change between the blocking state and the releasing state, the eccentric element must be rotated about an axis parallel to the pivot axis of the gripper arms.

In some cases, a transport device has a transport element that can be rotated about a machine axis. This transport element has container grippers. The container grippers have gripper arms preloaded in their closed position by spring force. Each container gripper has a curve-controlled closing element that blocks the gripper arms. A curve thus moves the closing element radially and against a resetting spring until it reaches a closed position. In the closed position, the blocking element straddles the gripper arms and prevents them from opening. It does so by preventing them from moving outward. This results in a positive-fit blocking of the gripper arms by the closing element.

Some container grippers have pivotable gripper arms on a carrier plate. The gripper arms define a container receptacle between them. A pressure spring preloads these gripper arms into a closed position. Oblique inlet elements on the front sides of the gripper arms use a spring force to push the containers into this container receptacle.

Some grippers have gripper arms that can be easily replaced with no tools. These grippers have a fixing element positioned between bearing ends that form an edge of a cut-out aperture. By relaxing a tension spring that urges the gripper arms to close and pivoting the arms into an extreme open position, it is possible to release the gripper arms. These grippers can have a carrying body that comprises deformable fitting tabs made of elastic material, for securing the container gripper to the transport element.

A gripper transitions between a releasing state and a blocking state.

In the releasing state, a spring force preloads the gripper arms into a closed position only to such an extent that a secure transfer of the containers to the container grippers as well as a secure release of the containers by the container grippers is possible by movement of the gripper arms apart from one another against the spring force.

In the blocking state, the spring exerts a force that is much greater than it exerted during the releasing state. However, an actual positive-fit blocking does not take place. The blocking element in this case is in its blocking position.

The container gripper according to the invention is preferably configured to suspend a container by a container neck formed near the container opening and/or at a ring or flange (neck ring) located near the container opening.

As used herein, "container" means cans, bottles, barrels, and kegs, in each case made of metal, glass, and/or plastic, preferably of PET (polyethylene terephthalate).

Terms such as "essentially," "some," and "approximately" indicate deviations from an exact value in each case by ±10%, preferably by ±5% and/or deviations in the form of changes that are not of significance for the function.

In a further embodiment of the invention, the container gripper is configured in such a way that the first and the second regions of its spring element are displaced against one another in the axial direction of movement of the blocking element.

In some embodiments, the blocking element can be moved in an axial direction radially or essentially radially to a pivot axis of the gripper arms and/or radially or essentially radially to a machine axis between the releasing position and the blocking position.

In some embodiments, the blocking element comprises at least two spring elements.

In other embodiments, the blocking element, with its spring elements, is movable in a space between control surfaces of the gripper arms facing one another.

In yet other embodiments, the blocking element is a spring tongue or a spring arm. Among these are embodiments in which the spring tongue or the spring arm is held at one end and remains free at the other end.

The spring has a cross-section along the blocking elements direction of movement. In some embodiments, this cross-section is constant, whereas in others, it changes along this direction of movement.

In some embodiments, the spring arm is arranged in such a way that it elastically deforms to varying extents depending on the position of the blocking element.

In other embodiments, when the spring arm is relaxed, it is straight or essentially straight. In others embodiments, the relaxed spring arm is cambered over at least part of its length.

In some embodiments, at least a part of the spring arm's length defines an angle with the axial direction of the displacement movement of the blocking element or extends obliquely relative to the axial direction of the displacement movement.

In some embodiments, the blocking element and the spring element are made as one piece. Suitable materials for such construction are a metallic material, such as spring steel, or plastic.

In some embodiments, the blocking element has a U-shaped profile with a base and two angled limbs extending over a common side of the base and with a spring arm on each limb oriented so that it extends away from the limb.

In some embodiments, the blocking element comprises a base and a section, such as a post, from which the spring arms extend. Among these embodiments are those in which the base or its limbs guides the blocking element on the transport element or on a carrier provided on the transport element. An example of such a carrier is a guide slot.

In some embodiments, the gripper arms are formed as double limbs. Each gripper arm is mounted such as to pivot between its two ends. At one end thereof, the gripper arms receive a container while at the other end they define a control surface.

Some embodiments include a bearing element upon which the gripper arms are mounted so that they can pivot. In these embodiments, the bearing element and gripper arms define a gripper unit. A latch securely engages the gripper unit to the transport element so that it can easily be removed and replaced.

In yet other embodiments, the blocking element includes a driver element that interacts with the control curve. This driver element controls movement of the blocking element. In some embodiments, the blocking element has a permanent magnet. In such cases, a suitable implementation of a driver element is a curve roller in which a bearing bolt is magnetically held in a bearing section of the blocking element by such this magnet.

In some embodiments, the foregoing features can in each case be used individually or in any desired combination.

Regardless of the respective configuration in detail, there are many advantages to the container gripper according to the invention.

For example, the container gripper and its gripper unit, in particular in the unblocked or releasing state, can deviate sideways under spring pressure. This allows it to compensate for possible division distortions, i.e. deviations in the division distance interval of container grippers or container receivers. This ability also allows the gripper to compensate for the fact that container-transport elements do not always operate in perfect synchrony when they connect to one another.

For a secure transfer of containers between transport elements and/or transport stars, it is particularly important, especially with rinsers, fillers, or closers, that the containers held at the container grippers of a transport element be spaced apart from each other by the correct distance interval and that they be released at the correct time. This is automatically achieved if the respective blocking element is located in the position that blocks the container gripper.

In the event of a crash, for example in the event of a possible erroneous transfer or acceptance of the containers between container grippers, the gripper unit concerned can easily be unlatched from the rotor that carries it without damaging any parts of the gripper. The function of the gripper can then easily be restored by first pushing the blocking element so that its spring arms no longer engage the gripper arms. The blocking element, with its spring arms being manually pressed together, can then be moved back so that it is once again in position to block the gripper arms.

The movement of the blocking elements of the container grippers between the blocking and releasing state is preferably controlled in each case by means of at least one driver element, interacting with at least one control curve, or by means of an appropriate curve roller. In this situation, the container gripper according to the invention is preferably configured in such a way that the position of the blocking element reached in each case with a section of the control curve, and therefore the corresponding state of the container gripper, remains retained even without the control curve, and specifically in particular also the blocked state of the container gripper, and specifically for as long as until a further section of the control curve takes effect on the blocking element. As a result, short control curves are possible. These reduce the structural effort and expenditure, the wear, and the manufacturing costs, as well as the cleaning of the corresponding transport device or of the container-handling machine.

The container gripper according to the invention further allows for the replacement of its function elements easily and rapidly, and without tools, in particular of complete modules and parts subject to wear.

The container gripper according to the invention also allows for the realization of transport elements with small pitch circle diameters, for example with a pitch circle diameter of only 540 mm and with small division (distance between the grippers from one another at the circumference), for example with a division of 3 $\pi$ (3 times PI). This corresponds to 18 container grippers with the pitch circle diameter of 540 mm referred to above.

Because the blocking effect is so secure, it is possible to securely hold filled containers even when they have very small neck rings or even when the grooves of the container's securing ring are only weakly defined. This means that the neck ring can be made thinner and narrower. As a result, less plastic will be needed to manufacture the bottles.

Because of the container carrier's open structure, it is easy to assemble and disassemble function elements. Cleaning is also simplified, in part because no spring elements other than that in the blocking element are needed.

The container gripper can be switched very rapidly between its blocking and releasing states, so making it suitable for high capacities (number of containers transported per time unit), and, in particular, only short movement lifts are required for the blocking element.

Another advantage is that the force required to cause controlled movement of the blocking element is relatively low. This reduces wear and noise.

Another advantage arises from the relatively low mass of the blocking element and the short distance it travels to change state. As a result of this low mass, it is possible to switch the container gripper's state quickly.

Preferably, all the function elements of the container gripper, and in particular the blocking element and the control surfaces of the gripper arms that interact with the blocking element, are located beneath the gripper arms. This reduces the possibility of contaminating the container with microorganisms. This is a significant risk because in many cases the container will still be open.

The container gripper according to the invention is suitable for use with transport elements or transport devices in general, wherein these transport devices are then, for example, parts of a transport segment with a plurality of transport devices following one another in a container transport direction, parts of a rinser, a filler, a closer, and/or a labeling machine, for example parts of a rotor at the container inlet and/or at the container outlet of the corresponding machine.

Further embodiments, advantages, and possible applications of the invention derive from the following description of exemplary embodiments and from the figures. In this situation, all the features described and/or represented as images are in principle the object of the invention, alone or in any desired combination, regardless of their summary in the claims or reference to them. The content of the claims is also deemed a constituent part of the description.

BRIEF DESCRIPTION OF THE DRAWINGS

The invention is described in greater detail hereinafter on the basis of the figures by reference to exemplary embodiments. The figures show:

FIG. 2 is a perspective view of one of the grippers in FIG. 1;

FIG. 3 is a perspective view of a spring-loaded blocking element of the container gripper shown in FIGS. 1 and 2;

DETAILED DESCRIPTION

Figure 1:
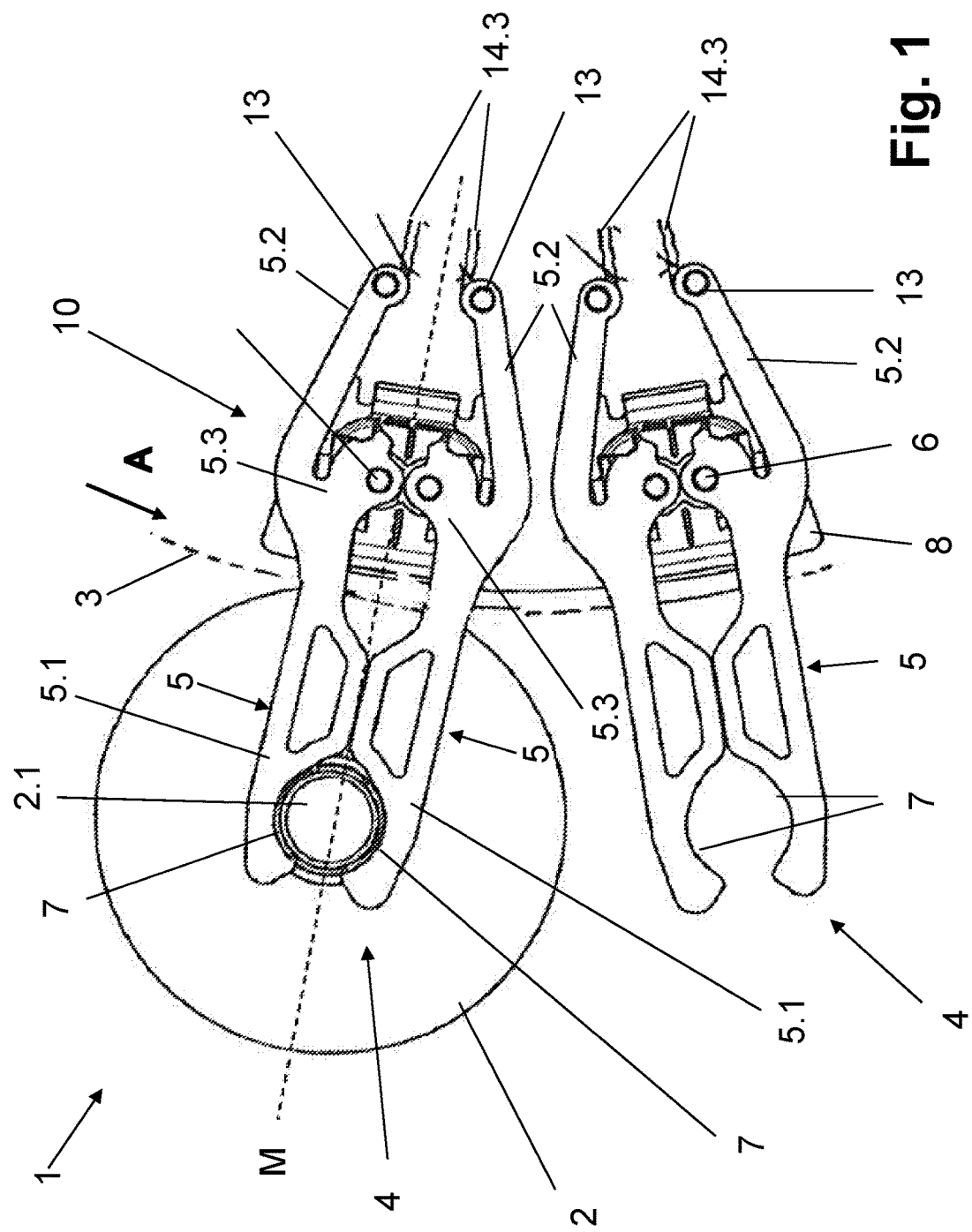
FIG. 1 shows two container grippers adjacent to each other with a container held at one of the grippers.
Figure 4:
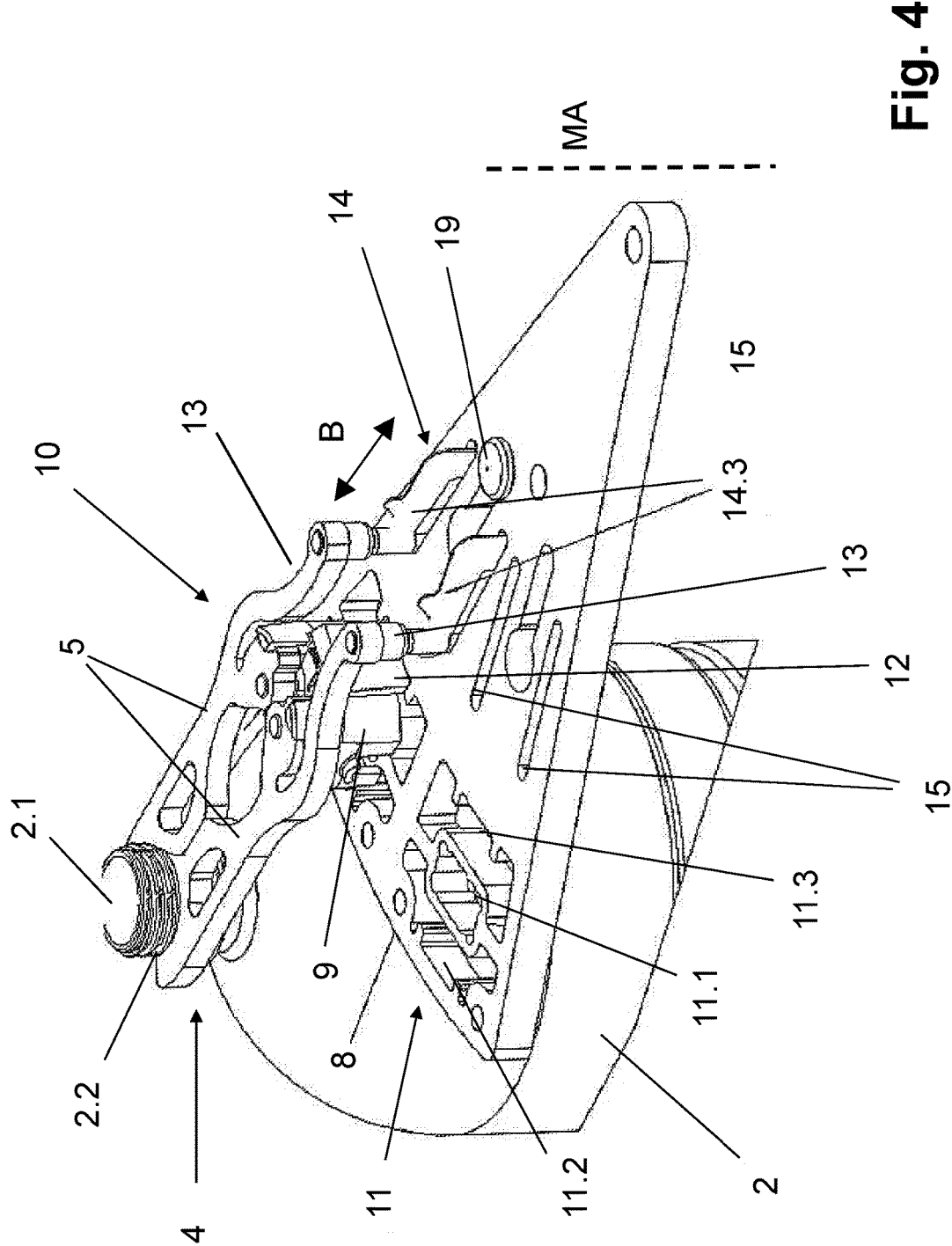
FIG. 4 shows the container gripper of FIG. 1 with a bearing mounting of the gripper unit arranged so that its spring clips are underneath.
Figure 5:
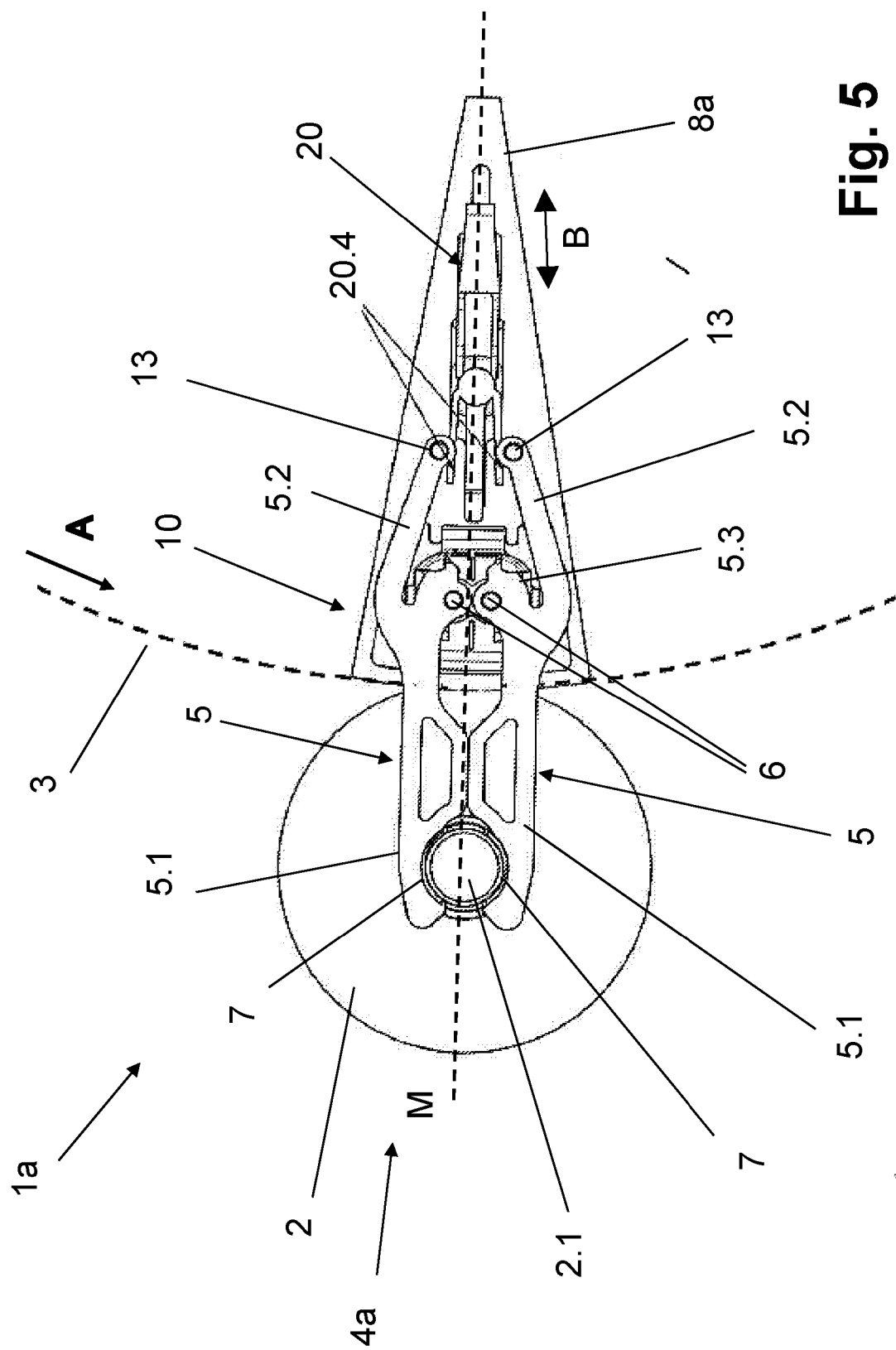
FIG. 5 is a view from above another embodiment of a container gripper holding a container.

FIGS. 1-4 shows a transport device 1, 1a for the transporting of containers 2. The containers are typically large-volume bottles, and in particular as bottles made of PET. The transport device 1 includes a rotor 3, driven such as to rotate about a vertical machine axis MA, which is indicated in FIG. 4 by a broken line.

Provided at the circumference of the rotor 3 and offset against one another at uniform angular distances about the machine axis MA are container carriers, which take the form of container grippers 4. These grippers 4 suspend a container 2 by its container neck or by a container flange 2.2 formed beneath the container opening 2.1 at the container neck.

Each container carrier 4 comprises two gripper arms 5 that are mounted to pivot about a joint bolt 6 about an axis that is parallel to the machine axis MA. Each gripper arm 5 has two levers or limbs defined by first and second gripper-arm sections 5.1, 5.2 and a projecting gripper arm section 5.3 between them. The gripper arms 5 are made of metallic material or plastic.

A joint bolt 6 engages the projecting gripper arm section 5.3. The first gripper-arm section 5.1 extends radially outward relative to the joint bolt 6 and the second gripper-arm section extends radially inward relative to the joint bolt 6.

The joint bolts 6 and the gripper arms 5 of each container gripper 4, 4a are located opposite one another in the circumferential or rotational direction A of the rotor 3.

To open the container gripper 4, the first gripper-arm sections 5.1 pivot so that they move apart from one another in opposite directions. To close the container gripper 4, the first gripper-arm sections 5.1 pivot in the opposite direction so that they move together.

The first gripper-arm sections 5.1 of opposing gripper arms 5 have a recess 7. These two recesses 7 cooperate to form a container receiver that clamps a container 2 around its neck. Preferably, the container is suspended by clamping at least 180° of its neck.

In the illustrated embodiment, the gripper arms 5 are provided on an upper side of a carrier 8 that is on the upper side of the rotor 3. In some embodiments, the carrier 8 is secured to the rotor 3. A suitable way to secure the carrier 8 is to use screws. In other embodiments, the carrier 8 and rotor 3 are formed as one piece.

The gripper arms 5 are mirror images of each other about an imaginary middle plane M that passes through and contains the machine axis MA. Additionally, the gripper arms 5 project with their ends located radially outwards relative to the machine axis MA over the carrier 8 as well as over the circumference of the rotor 3.

The two joint bolts 6 are mounted in a bearing defined by a middle section of a receiver 9, best seen in FIG. 2. The gripper arms 5 and the receiver 9 thus define a distinct gripper unit 10. A latch secures each gripper unit 10, together with its receivers 9, to the carrier 8.

As shown in FIG. 4, each carrier 8 has an arrangement 11 of cut-outs for receiving two gripper units 10, The arrangement 11 includes a first cut-out 11.1 and second and third cut-outs 11.2, 11.3 on either side of the first cut-out 11.1. The second cut-out 11.2 is offset radially outward from the first cut-out 11.1 and the third opening is offset radially inwards relative to the first cut-out 11.1. Together, the second and third cut-outs 11.2, 11.3 define a latch engagement that is produced as one piece.

Figure 6:
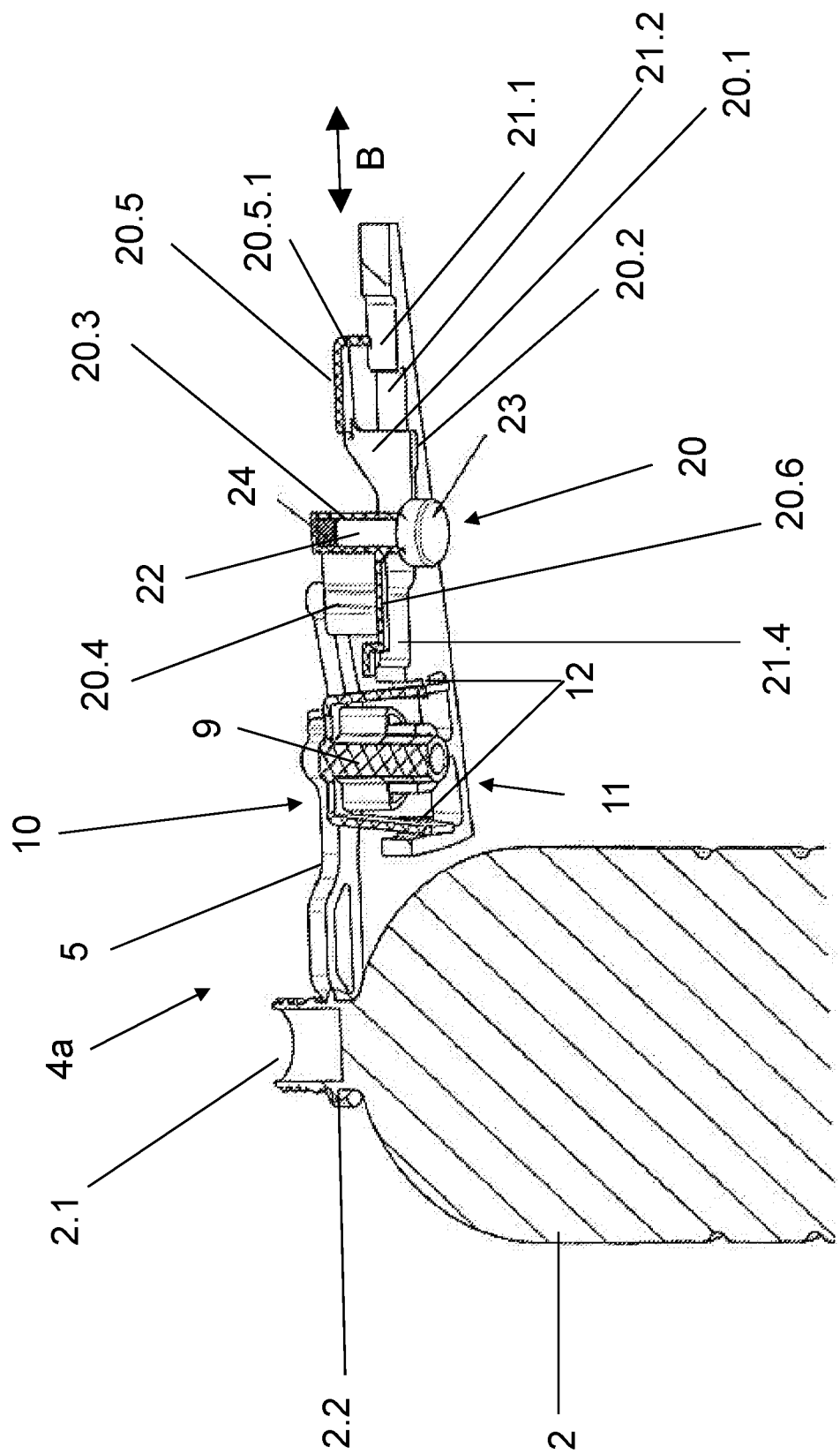
FIG. 6 is a longitudinal section of the gripper shown in FIG. 5.

As can be seen in FIG. 6, the receiver 9 includes two wings 12 that straddle the middle section. The latch engagement latches the receiver 9, including its wings 12, in the region of their lower free ends in latch retainers that are provided on edge surfaces of the second and third cut-outs 11.2, 11.3 remote from the first cut-out 11.1.

Connecting the gripper unit 10 includes inserting the receiver 9 into the arrangement 11 from one side, which in this case is from above, such that the first cut-out 11.1 accommodates the middle section of the receiver 9. The second and third cut-outs 11.2, 11.3 then engage the corresponding wings 12 thus latching the gripper unit 10 into place.

To release the latch, one squeezes the wings 12 together. The gripper unit 10 can then be removed upwards from the carrier 8. This makes it possible to easily carry out a format change, for example to readjust the transport device 1 for carrying containers 2 with another container neck diameter. It also makes it possible to easily remove the gripper unit 10 for repair and/or cleaning thereof. The first, second, and third cut-outs 11.1-11.3 are longitudinal holes and oriented with their longitudinal extension in the transport direction A.

Each second gripper-arm section 5.2 has an end bolt 13 at the free end thereof. The end bolt 13 extends in a direction that is parallel to the joint bolt 6.

In the embodiment shown, the two end bolts 13 are located on the underside of each gripper arm 5 facing the carrier 8. Each end bold 13 forms engagement surface or control surface for a spring-loaded blocking element 14, which is shown in FIG. 3.

The blocking element 14 is provided separately for each container gripper 4 and for each gripper unit 10. In the illustrated embodiment, with two gripper units 10 provided on the carrier 8, there are two spring-loaded blocking elements 14 on the carrier 8. The blocking element 14 comprises two limbs 14.2 and two spring element 14.3 that are arranged to define a yoke. Each spring element 14.3 can be viewed as a spring arm or a spring tongue.

The blocking element 14 is produced from a spring-steel sheet by cutting, punching, and/or bending to form a U-shaped profile having a baseplate 14.1 that forms the base of the "U" and two lateral extensions that, when bent at an angle, form the two limbs 14.2 that form the two sides of the "U".

At their ends remote from the baseplate 14.1, the two limbs 14.2 extend backwards to form a lateral extension. This lateral extension defines each spring element 14.3.

In FIG. 3, the blocking element 14 is in its relaxed state. In this relaxed state, the spring elements 14.3 remain essentially parallel to one another and extend in the same direction away from the limbs 14.2. In this configuration, the side of the spring element 14.3 is essentially coplanar with the side of its corresponding limb 14.2 and oriented with its longitudinal extension parallel to the surface sides of the baseplate 14.1. As a result, in the relaxed state, there is a slight pre-loading by the spring elements 14.3.

The blocking element 14 is mounted on the carrier 8 in such a way that the baseplate 14.1 is located on the underside of the carrier 8 facing away from the gripper arms 5. The surface side of the baseplate 14.1, which is that side that faces the limbs 14.2, is located adjacent to this underside.

The limbs 14.2 extend through corresponding first and second slots 15, which are shown in FIG. 2. The spring elements 14.3 project with their sides extending parallel or essentially parallel to the axes of the joint bolts 6 as well as perpendicular or essentially perpendicular to the plane of the upper side of the carrier 8. The spring elements 14.3 extend above the upper side of the carrier 8. The free ends of the spring elements 14.3, which are located remotely from their corresponding limbs 14.2, are offset radially outwards relative to the machine axis MA and relative to these limbs 14.2.

The first and second slots 15 are oriented with their longitudinal extension parallel or essentially parallel to the mid-plane M. These slots 15 are long enough so that it is possible to displace the blocking element 14 in a radial direction, as defined by the machine axis MA, along a displacement direction B at least enough to accommodate a movement lift that occurs when switching the blocking element 14 between its releasing position and its blocking position.

The arrangement 11 is constructed in such a way that, when the gripper 4 is ready to be used, the two spring elements 14.3 of the blocking element 14 are always received between the two end bolts 13 in a way that slightly squeezes the spring elements 14.3 together such that they elastically deform like a leaf spring. As a result, throughout the movement lift, the spring elements 14.3 exert a spring force on the regions of the end bolts 13 that face one another. This means that the spring elements 14.3 exert a closing force onto the gripper arms 5.

Radially displacing the blocking element 14 has the effect of controlling this closing force. Such radial displacement is controlled a curve roller 16, shown in FIG. 2, which is freely rotatable about an axis parallel to or essentially parallel to the machine axis MA, as well as projecting over the underside of the carrier 8. The curve roller 16 interacts with at least one control curve that does not rotate with the rotor 3 and that is common to all the container grippers 4 of the transport device 1. Such a control curve would typically be provided in a device frame of the transport device 1.

In order to secure the blocking element 14 to the carrier 8, as well as to limit the movement lift between the releasing and blocking position, the baseplate 14.1 is provided with a longitudinal hole 18 through which a securing element 18.1 engages. A suitable securing element 18.1 is a screw engaging in a thread of the carrier 8.

A bearing piece serving to mount the curve roller 16 extends through a keyhole slot 15.1 between the first and second slots 15. The keyhole slot 15.1 extends along a direction radial to the machine axis MA and to the upper side of the carrier 8. A slide element 19 for guiding and is provided at the keyhole slot 15.1 to serve as a guide element.

The closing force depends on the position of the blocking element 14. In particular, the position of the blocking element 14 controls the position of the spring elements 14.3 relative to the end bolts 13. This controls the effective length of the spring elements 14.3, and thus the effective spring constant.

To reach its releasing position, the blocking element 14 moves radially inward relative to the machine axis MA. This increases the effective length of the two spring elements 14.3. In one example, the blocking element 14 reaches its releasing position when the blocking element 14 has moved radially inward far enough for the end bolts 13 to contact the free ends of the spring elements 14.3. The limbs 14.2 in this case would approach and possibly reach the radially inner ends of the slots 15 facing the machine axis MA. This reduces the effective spring constant of the spring elements 14.3. This, in turn, means that there will a reduced closing force for the container gripper. The container gripper 4 is thus in the releasing state and the blocking element 14 is in the releasing position.

Conversely, to increase the closing force, the blocking element 14 moves radially outwards relative to the machine axis MA. This shortens the effective length of the spring elements 14.3. As a result, the effective spring constant increases, which in turn increases the closing force.

When the blocking element 14 is at the blocking position, the distance between the free ends of the limbs 14.2 becomes greater than that distance between the end bolts 13. However, because of the slots 15, no torsion of the limbs 14.2 occurs. Thus, the spring force of the blocking element 14, and therefore the closing force exerted on the gripper arms 5, is essentially only produced by the spring elements 14.3.

At both the transfer of a container 2 to a container gripper 4 and its removal from the container gripper 4, the blocking element 14 is in its releasing position. The reduced closure force exerted in when the blocking element 14 is in its releasing position is enough to reliably take up the container 2 at a container inlet of the transport device 1 by having the gripper arms 5 snap inwards at the container neck. Additionally, the reduced closure force is low enough to easily remove the container 2 at a container outlet of the transport device 1 by moving the gripper arms 5 apart against the effect of the blocking element 14.

Once the gripper arms 5 have taken up a container 2, a control curve interacts with the curve roller 16 to move the blocking element 14 to radially outwards relative to the machine axis MA until it reaches its blocking position. This causes the spring elements 14.3 to exert a greater closing force. The closing force in this blocking state of the container gripper 4 is sufficiently great to reliably hold even filled containers 2 at the container gripper 4 even with the rotor 3 rotating rapidly.

The extent to which the closing force increases can be controlled by controlling how far the blocking element 14 moves radially outward. This means that the closing force can be adjusted to circumstances. For example, different container neck diameters can be handled by adjusting the position of the blocking element 14 to achieve the correct closing force for a particular neck.

FIGS. 5-8 show another embodiment of a container gripper 4a that is a constituent part of a transport device 1a that has a rotor 3 rotating about the machine axis MA and that has plural container grippers 4a at a circumference thereof. The container gripper 4a differs from the container gripper 4 shown in FIGS. 1-4 essentially only in that a molded plastic blocking element 20, best seen in FIG. 8, replaces the sheet metal blocking element 14. In addition, every container gripper 4a has its own individual carrier 8a. This container carrier 8a is configured to latch the gripper unit 10.

Moving the blocking element 20 along a movement direction B changes the closing force exerted onto the gripper arms 5. The movement direction B is radial relative to the machine axis MA and along the container gripper's plane of symmetry M and that of the gripper unit 10. Guidance of the movement lift between the releasing position and the blocking position is carried out by a base 20.1 in a guide slot 21 of the carrier 8a.

Figure 7:
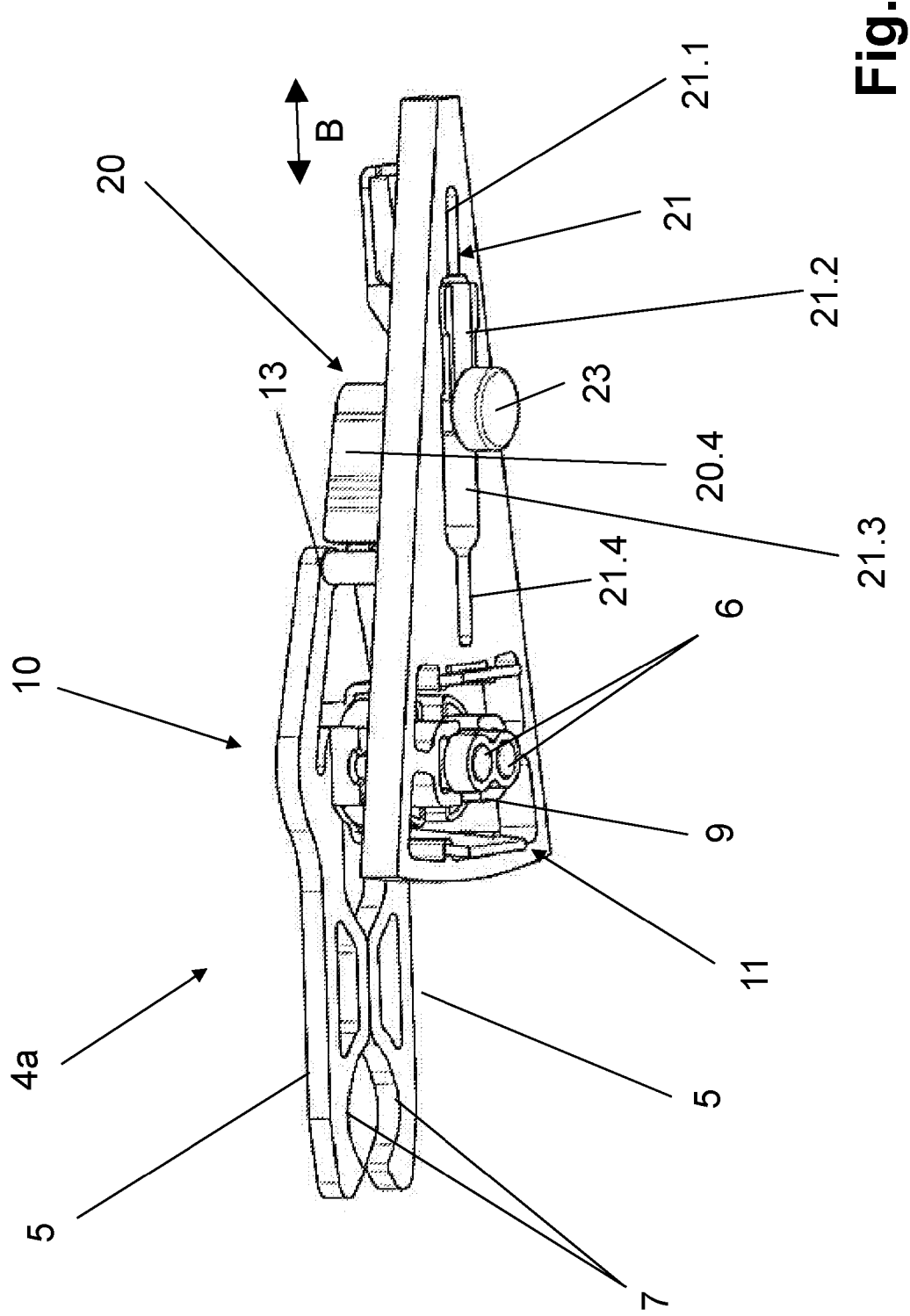
FIG. 7 is a view from below the container gripper shown in FIG. 5.

The guide slot 21 is oriented with its longitudinal extension radial to the machine axis MA. Its length is greater than the extent of movement between the releasing position and the blocking position. As can be seen in FIG. 7, the guide slot 21 comprises first through fourth sections 21.1-21.4 of differing widths that merge into one another as one traverses the guide slot 21 in the radial direction. The first section 21.1 is radially innermost and the fourth section 21.4 is radially outermost. The second and third sections 21.2, 21.3 lie between the first and fourth sections 21.1, 21.4 with the second section 21.2 being radially inward from the third section 21.3.

As shown in FIG. 6, angled elements 20.2 on the base 20.1 engage behind the edge of the guide slot 21 on the underside of the carrier 8a. This secures the blocking element 20 to the carrier 8a without impeding its movement along the guide slot 21. The blocking element 20 projects with a bearing section 20.3 through the guide slot 21 over the upper side of the carrier 8a and is formed there with two spring arms 20.4 whose function corresponds to that of the spring elements 14.3. With the blocking element 20 mounted, the spring arms 20.4 extend above the carrier's upper side.

At the end facing away from the spring arms 20.4 and located radially inwards relative to the machine axis MA, a latch arm 20.5 is formed on the base 20.1. This latch arm 20.5 functions as a spring-loaded latch arm. At a free end of the latch arm 20.5 is an angle element 20.5.1. With the container gripper 4a completely mounted, the latch arm 20.5 engages the first section 21.1 of the guide slot 21 in such a way that when the blocking element 20 moves towards the machine axis MA the angle element 20.5.1 finally contacts the closed end of the first section 21.1. This defines the position at which the blocking element 20 causes the least closing force. This also prevents the spring arms 20.4 from coming out of engagement with the end bolts 13.

With the container gripper 4a having been mounted, the guide slot's second section 21.2 guides the base 20.1 and its third section 21.3 guides the bearing section 20.3. The angle elements 20.2, which are arranged at a distance from the bearing section 20.3 in the direction of the machine axis MA, engage behind the edge of the second section 21.2.

A bearing bolt 22 that projects beyond the underside of the carrier 8a secures a curve roller 23 to the bearing section 20.3 so that it can rotate relative to the bearing section 20.3. This curve roller 23 operates in a manner analogous to curve roller 16 to interact with a fixed-position control curve. This interaction controls movement of the blocking element 20.

In the illustrated example, a single piece forms the curve roller 23 and the bearing bolt 22. A cut-out of the bearing section 20.3 accommodates the bearing bolt 22 while a permanent magnet 24 holds the bearing bolt 22 in the cut-out.

One side of the bearing section 20.3 faces away from the latch arm 20.5. A web-type extension 20.6 projects over this side. With the container gripper 4, 4a completely mounted and ready for operation, the web-type extension 20.6 is guided in the fourth section 21.4 and forms a stop that interacts with the end of the fourth section 21.4. This interaction limits further radially-outward movement of the blocking element 20 relative to the machine axis MA.

With the gripper unit 10 taken up by the carrier 8a, and with the curve roller 23 not yet provided at the blocking element 20, the blocking element 20 can be easily mounted by inserting it from the upper side of the carrier 8a into the guide slot 21. During this procedure, the bearing section 20.3 and the base 20.1, comprising the angle elements 20.2, are first inserted into the third section 21.3. The blocking element 20 is then pushed into the guide slot 21 towards the machine axis MA far enough so that the narrower first section 20.1 receives the base 20.1 opposite the third section 21.3. The angle elements 20.2 engage behind the edge of this section. Following this, the curve roller 23 is mounted with its bearing bolts 22.

Figure 8:
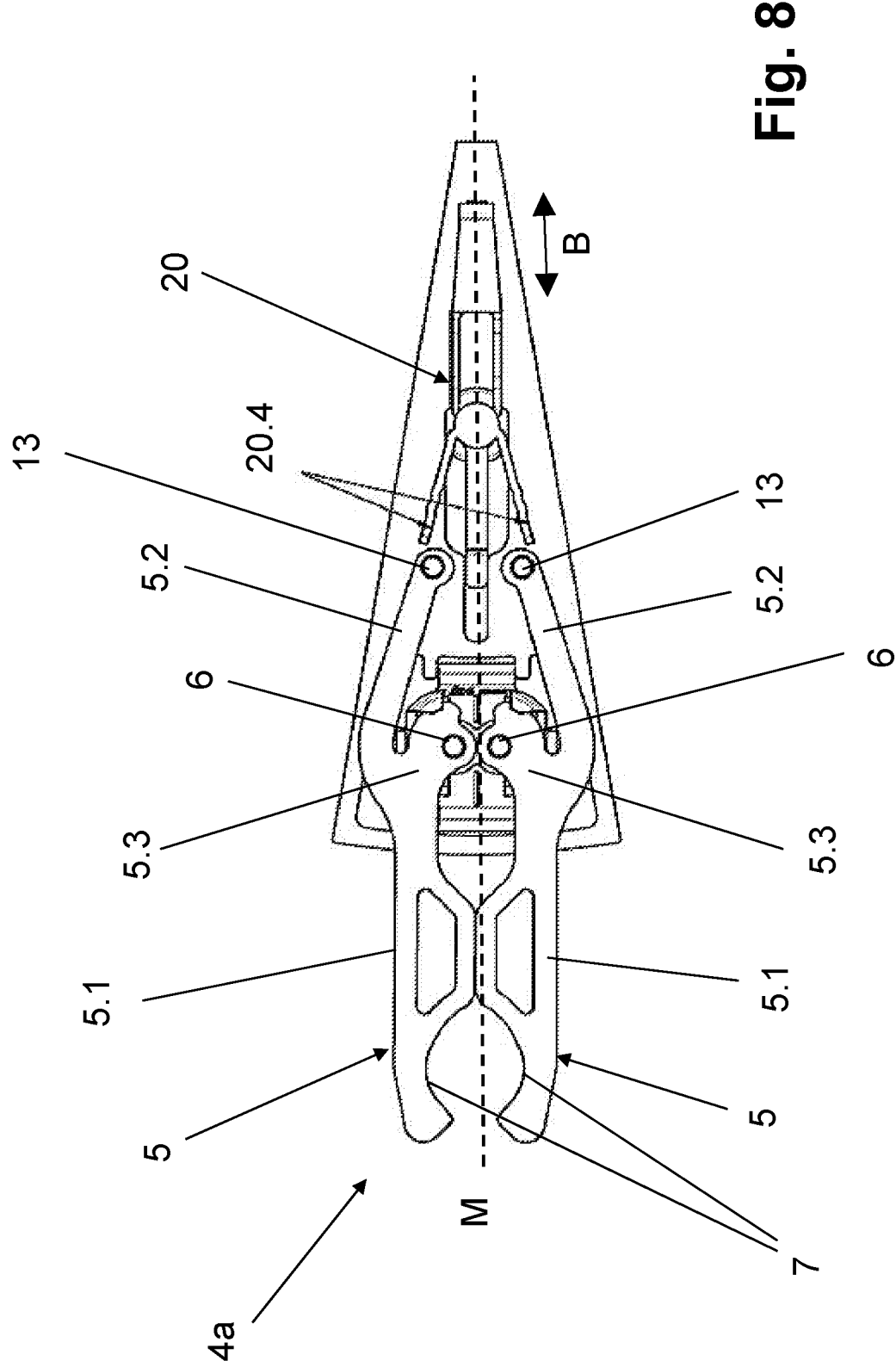
FIG. 8 is a view from above the container gripper shown in FIG. 7 with the container gripper being in its unlatched position, for example after an overload or a collision.

For the further installation of the container gripper 4a, the blocking element 20 moves radially inwards far enough so that after the gripper element 10 has been inserted, the blocking element 20 is in a position in which the spring arms 20.4 are out of engagement with the gripper arms 5, as shown in FIGS. 7 and 8. In this configuration, the angle element 20.5.1 is outside the guide slot 21, and against the upper side of the carrier 8a. This results in a spring effect.

From this state, with the spring arms 20.4 being pressed together and by displacement radially outwards relative to the machine axis MA, the blocking element 20 is mounted in such a way that both the spring arms 20.4 are then accommodated in the manner required between the end bolts 13 of the jointed arms 5 and both spring arms 20.4 are supported against the end bolts 13 as well as against the underside of the jointed arms facing the carrier 8a.

The two spring arms 20.4 are in turn configured in such a way that their surface sides are oriented in planes parallel or essentially parallel to the axes of the joint bolts 6 and therefore perpendicular or essentially perpendicular to the plane of the upper side of the carrier 8a. Moreover, with this configuration, moving out from the bearing section 20.3, the spring arms diverge in such a way that the opposing distance interval of the spring arms 20.2 increases with the increasing distance interval from the bearing section 20.3. Moreover, the blocking element 20 is mounted in such a way that the free ends of the spring arms 20.4 exhibit a greater radial interval from the machine axis MA than that region at which the spring arm 20.4 merges into the bearing section 20.3.

With the container gripper 4a fully mounted, the two spring arms 20.4 of the blocking element 20 are constantly accommodated between the two end bolts 13. If, in this situation, the blocking element 20 is located in a position in which the two spring arms exhibit a substantial effective length, i.e. the end bolts 13 are in contact, for example, against the free ends of the spring arms 20.4, and for this purpose the blocking element 20 is moved radially inwards relative to the machine axis MA into its releasing position, then, with reduced effective spring forces of the spring arms 20.4, a reduced closing force is incurred for the container gripper 4, 4a. In order to increase the closing force, the blocking element 20 is moved radially outwards relative to the machine axis MA, into its blocking position, such that the effective length of the spring arms 20.4, i.e. the distance interval between those regions of the spring arms against which the end bolts 13 are in contact, is shortened by the bearing section 20.3, such that, with increased effective spring forces, an increased closure force is exerted by the spring-loaded blocking element 20 onto the gripper arms 5, and in this situation the preloading can also be increased, although this depends on the respective geometry.

At the transfer of a container 2 at a container gripper 4, 4a, as well as at the removal of a container 2 from a container gripper 4, 4a, the blocking element 20 is located in its releasing position, having been moved inwards relative to the machine axis MA. In this position, the two spring arms 20.4 exert a reduced closing force on the gripper arms 5. The reduced closing force nevertheless remains sufficient to securely pick up and hold the container 2 at a container inlet of the transport device 1, 1a by snapping the gripper arms 5 around the container neck. The reduced closing force also permits easy removal of the containers 2 at a container outlet of the transport device 1a by simply moving the gripper arms 5 apart against this relatively low force.

Shortly after the gripper has picked up the container 2, the curve roller 23 interacts with a control curve to move the blocking element 20 radially outwards relative to the machine axis MA until it reaches its blocking position. When the blocking element 20 reaches the blocking position, the effective length of the spring arms 20.4 taking effect on the gripper arms 5 is reduced. This, in turn, increases the spring force on the gripper arms 5. This, in turn, causes them to more securely hold the containers 2.

By correctly choosing the blocking position, it becomes possible to adjust the closing force of the container gripper 4a. This is useful for adjustment to different neck diameters of different kinds of containers 2. In any event, however, the closing force in this blocking state of the container gripper 4a is sufficiently great for even filled containers 2 to be held reliably at the container gripper 4a, even with the rotor 3 rotating rapidly.

In some embodiments, the gripper units 10 and the blocking units 14, 20 are provided on a carrier 8, 8a that is secured to the rotor 3. In an alternative embodiment, the gripper units 10 and the blocking elements 14, 20 are directly on the rotor 3. In one such embodiment, the carriers 8, 8a are segments of the rotor 3.

To produce the closing force that changes with the displacement of the blocking element 14, 20, or in order to support this effect, it is also possible for the spring element 14.3, 20.4 to have a cross-section that changes in the direction of movement B of the blocking element 14, 20, and/or is arranged in such a way that it is elastically deformed to differing degrees at different positions of the blocking element 14, 20, for example more markedly in the blocking position than in the releasing position. In such embodiments, at least one part length of the respective spring arm encloses an angle with the axial direction of the displacement movement of the blocking element or extends along a direction that is oblique to the movement direction B.

Having described the invention, and a preferred embodiment thereof, what is claimed as new and secured by Letters Patent is:

1. An apparatus comprising a container gripper, wherein said container gripper comprises pivotable gripper-arms and a blocking element, wherein said blocking element comprises spring elements that preload said gripper arms into a closing position, wherein each of said spring elements comprises a first region and a second region, wherein each gripper arm comprises a control surface, thereby defining first and second control surfaces, wherein said blocking element is movable along a movement direction between a releasing position, which corresponds to said gripper's releasing state, and a blocking position, which corresponds to said gripper's blocking state, wherein, in said releasing position, said spring elements exert a first closing force on said gripper arms and wherein, in said blocking position, said spring elements exert a second closing force on said gripper arms, said second closing force being greater than said first closing force, wherein said spring elements interact with said control surfaces of said gripper arms such that, when said blocking element is in said releasing position, said control surface takes effect against said first region, thereby causing said spring element to exert said first closing force, and wherein, when said blocking element is in said blocking position, said control surface takes effect against said second region, thereby causing said spring element to exert said second closing force.

2. The apparatus of claim 1, wherein said blocking element moves along an axial direction and wherein said first and second regions of said spring element are offset against one another along said axial direction.

3. The apparatus of claim 1, wherein said blocking element is configured to transition between said releasing position and said blocking position by moving in a direction that is radial relative to the machine axis.

4. The apparatus of claim 1, wherein said first and second control surfaces face each other and define a space through which said spring element is movable.

5. The apparatus of claim 1, wherein said spring element comprises a spring tongue that has a first end and a second end, wherein said spring tongue is supported at said second end, wherein said first end is a free end, wherein said first region and said second region are on said spring arm, and wherein said first region is closer to said free end than said second region.

6. The apparatus of claim 1, wherein said spring element comprises spring arms and wherein said spring arms assume a relaxed state, wherein, when in said relaxed state, said spring arms are essentially straight.

7. The apparatus of claim 1, wherein said spring element comprises a spring tongue, at least a portion of which is cambered.

8. The apparatus of claim 1, wherein said blocking element is a unitary structure that is made from spring steel.

9. The apparatus of claim 1, wherein said blocking element has a U-shaped profile defined by a base, wherein said blocking element has limbs that project upward from said base, and wherein said spring element comprises spring arms that extend from said limbs.

10. The apparatus of claim 1, wherein said blocking element has a U-shaped profile defined by a base, wherein said blocking element comprises posts that project upward from said base, and wherein said spring element comprises spring arms that extend from said posts.

11. The apparatus of claim 1, further comprising a guide slot that moves with a transport element, wherein said guide slot guides said blocking element, wherein said blocking element has a U-shaped profile defined by a base and limbs that project upward from said base, wherein said spring element comprises spring arms that extend from said limbs, and wherein said limbs and said spring arms are configured to be received by said guide slot.

12. The apparatus of claim 1, further comprising a carrier having a guide slots, wherein said blocking element comprises a baseplate and limbs that extent from said baseplate and through said guide slots, and wherein said guide slots guide said blocking element.

13. The apparatus of claim 1, further comprising a gripper unit, wherein said gripper arms and a receiver form said gripper unit, wherein said gripper unit latches to said transport element so as to be removable by disengaging said latch, wherein said gripper arms are double-lever arms, wherein each gripper arm is mounted to pivot about said receiver, said receiver being disposed between its two ends, and wherein said gripper arms receive a container at a first end thereof and define a control surface at a second end thereof.

14. The apparatus of claim 1, further comprising a curve roller for controlling said movement of said blocking element, wherein said curve roller comprises a bearing bolt, wherein said blocking element comprises a bearing section and a permanent magnet, and wherein said bearing section holds said bearing bolt using said permanent magnet.

15. The apparatus of claim 1, further comprising a transport device for transporting containers, wherein said transport device comprises a transport element and wherein said container gripper is one of a plurality of identical container grippers disposed on said transport element.

16. The apparatus of claim 1, further comprising a transport device for transporting containers, wherein said transport devices comprises a rotor that comprises said container grippers, wherein, as said rotor rotates around a machine axis, said blocking element moves along said movement direction between said releasing position and said blocking position.

17. The apparatus of claim 1, wherein said spring element is an element that is selected from the group consisting of a leaf spring and a yoke clamping clip.

18. The apparatus of claim 1, wherein said blocking element is configured to transition between said releasing position and said blocking position by moving in a direction that is radial relative to a pivot axis of said gripper arms.

19. The apparatus of claim 1, wherein said spring element comprises a spring tongue that has a cross-section that is constant along said movement direction.

20. The apparatus of claim 1, wherein said spring element comprises a spring tongue that has a cross-section that is variable along said movement direction.

21. The apparatus of claim 1, wherein said blocking element is a unitary structure that is made from plastic.

* * * * *